E. A. SPERRY.
GEARING.
APPLICATION FILED NOV. 14, 1913.

1,257,417.

Patented Feb. 26, 1918.
6 SHEETS—SHEET 1.

Fig. 1.

WITNESSES

INVENTOR
Elmer A. Sperry,
ATTORNEY

E. A. SPERRY.
GEARING.
APPLICATION FILED NOV. 14, 1913.

1,257,417.

Patented Feb. 26, 1918.
6 SHEETS—SHEET 4.

WITNESSES

INVENTOR
Elmer A. Sperry,
BY
ATTORNEY

E. A. SPERRY.
GEARING.
APPLICATION FILED NOV. 14, 1913.

1,257,417.

Patented Feb. 26, 1918.
6 SHEETS—SHEET 5.

UNITED STATES PATENT OFFICE.

ELMER A. SPERRY, OF NEW YORK, N. Y.

GEARING.

1,257,417.  Specification of Letters Patent.  Patented Feb. 26, 1918.

Application filed November 14, 1913. Serial No. 801,020.

*To all whom it may concern:*

Be it known that I, ELMER A. SPERRY, a citizen of the United States of America, and residing at New York, in the county of Kings and State of New York, have invented new and useful Improvements in Gearing, of which the following is a specification.

The principal object of my invention is to eliminate the manual shifting of gears ordinarily incidental to the changing from one speed to another, and further, to effect this much desired result by means of simple and practical mechanism operating positively and effectively to do the work intended.

The act of shifting gears as for instance, in the driving of an automobile, has heretofore required the exercise of considerable skill and judgment and my invention has, as another one of its objects, to obviate this need for any special skill and to render it possible for anyone even without previous experience to change gears in the proper manner.

In the accomplishment of these various objects my invention contemplates the employment of power mechanism for actually shifting the gears and controllable means for selectively controlling the operation of the power actuated gear shifting mechanism. In the present disclosure such power actuated mechanism takes the form of a cam member and a plurality of shifters actuated thereby and designed to effect the respective gear shifting movements, while the selective mechanism takes the form of electromagnets adapted to render the different shifters operative and a controller for such electromagnets.

In change speed gearing there is usually employed a clutch of some sort for uncoupling the gear mechanism from the motor while shifting the gears, and in this connection it is one of the objects of the invention to insure that the clutch shall be thrown out before the gears are shifted and that the shifting action of the gears shall be entirely completed before the clutch is again engaged. To this end the invention contemplates the interconnection of the gear shift with the clutch operating mechanism in a manner to effect these sequential operations.

A further object is to make possible either the use of the power actuated gear shift or to shift the gears by hand in the usual way, as may be desired.

My invention is of particular value with the change speed gearing of automobile transmission systems, for which reason I have so illustrated it in the present disclosure and in this connection I would have it known that another one of the objects of my invention is to provide a power actuated gear shift which may readily be applied to the more or less standardized automobile transmission systems which are now in common use.

The accompanying drawings illustrate in concrete form one typical embodiment of my invention but I would have it understood that the invention is susceptible of many changes and modifications without departure from the true spirit and scope of the invention.

Figure 1:
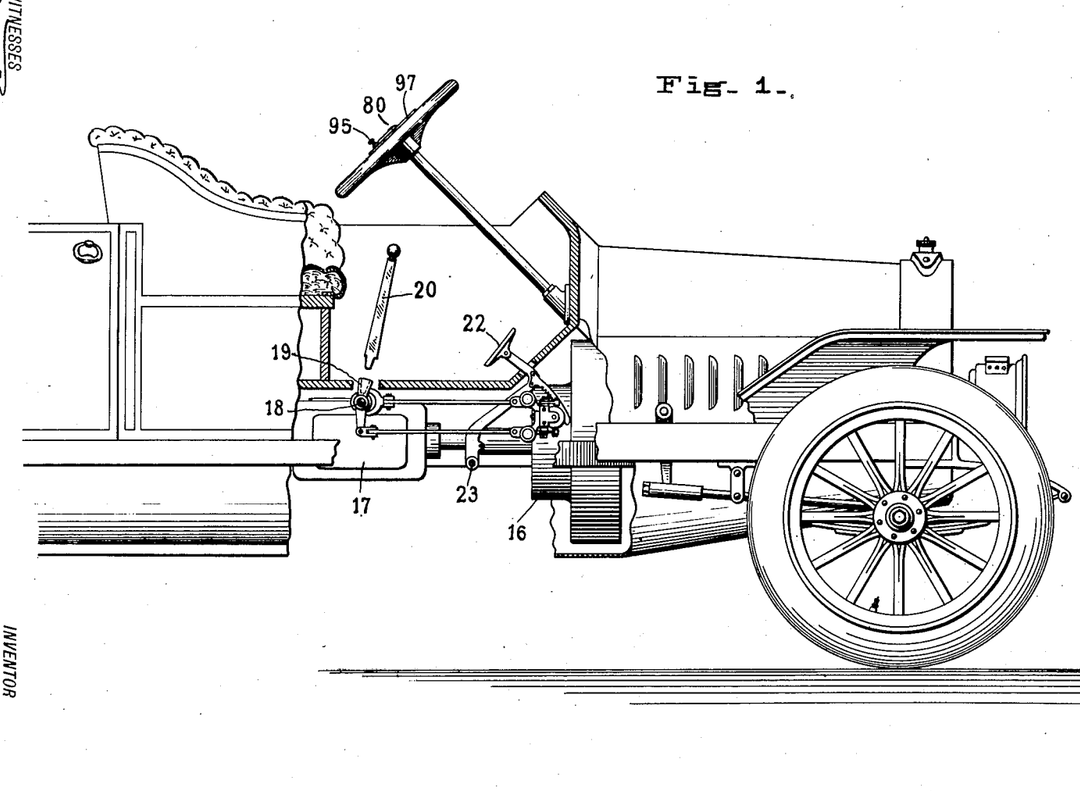
Figure 1, is a side elevation, partially broken away and in section, showing an adaptation of the invention to an automobile of conventional type.
Figure 2:
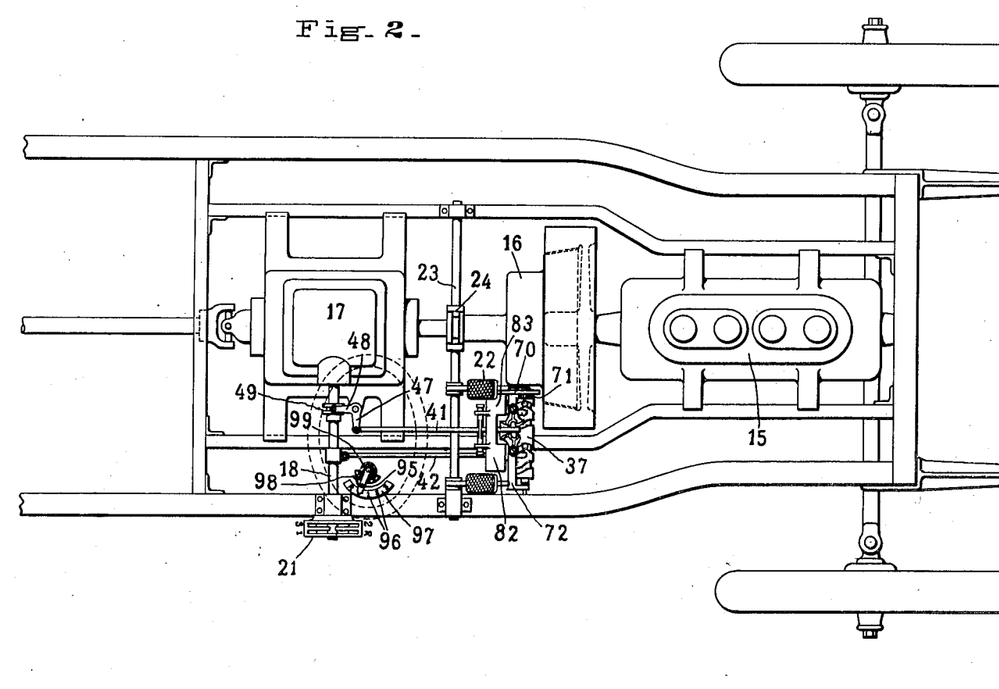
Fig. 2, is a plan view of the chassis of the same.
Figures 3, 4, 5:
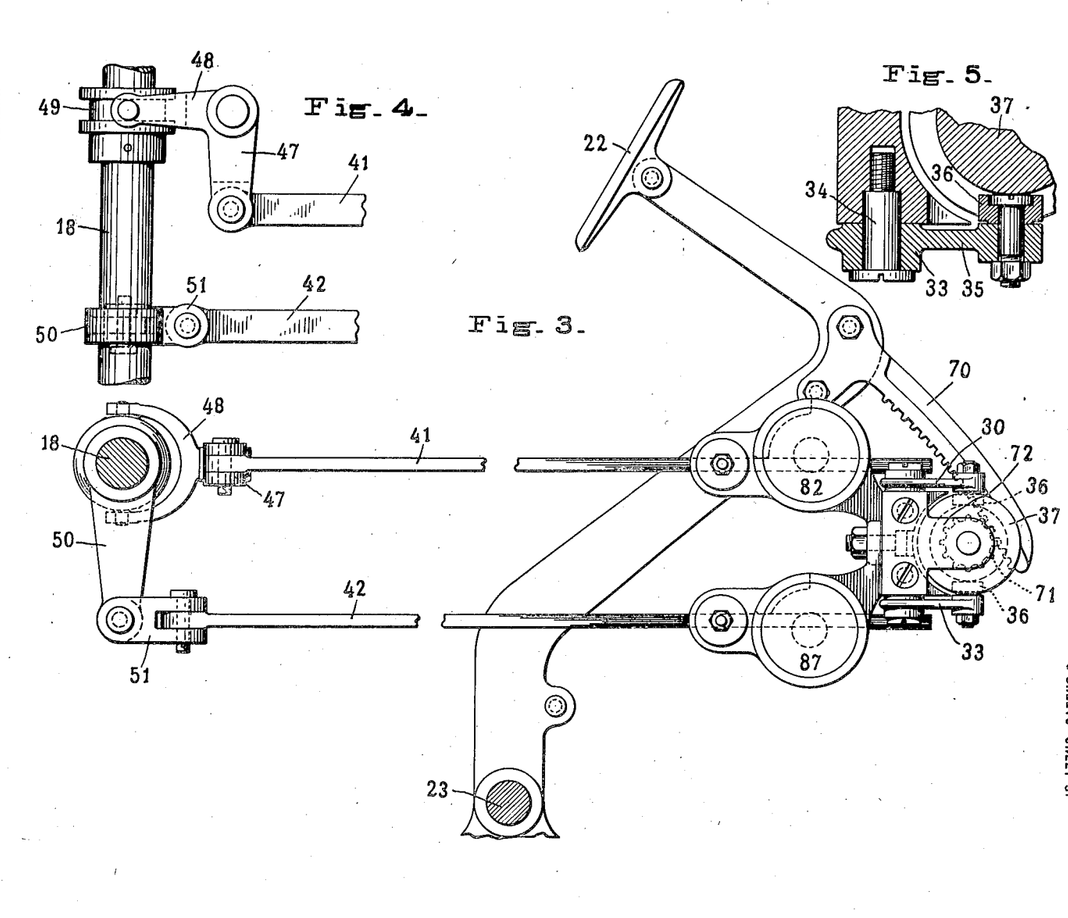
Fig. 3, is an enlarged view in side elevation of the gear shifting mechanism and connections to the gear box illustrating in detail the interconnection between the clutch operating means and the gear shift mechanism.
Fig. 4, is a broken plan view of the connections from the gear shift mechanism to the gear shifting shaft.
Fig. 5, is a fragmentary sectional view of the cam cylinder and one of the shifting cam levers operated thereby.

In the automobile conventionally illustrated in the first two figures, 15 is the motor, 16 indicates a clutch between the motor and the change speed transmission gearing 17, and 18 is the gear shifting shaft which extends into the gear box and is both longitudinally and rotatably movable for the purpose of shifting the gears. Provision is made for shifting the gears by hand in the usual way by making this gear shifting rock shaft with a socket 19, adapted to receive a hand lever 20, which when in use operates in the usual H-segment 21 in the customary way. Engagement and disengagement of the clutch is controlled by a pedal 22 mounted on a supporting shaft 23 and having connection with the movable element of the clutch through the medium of a shipping fork 24.

Figure 6:
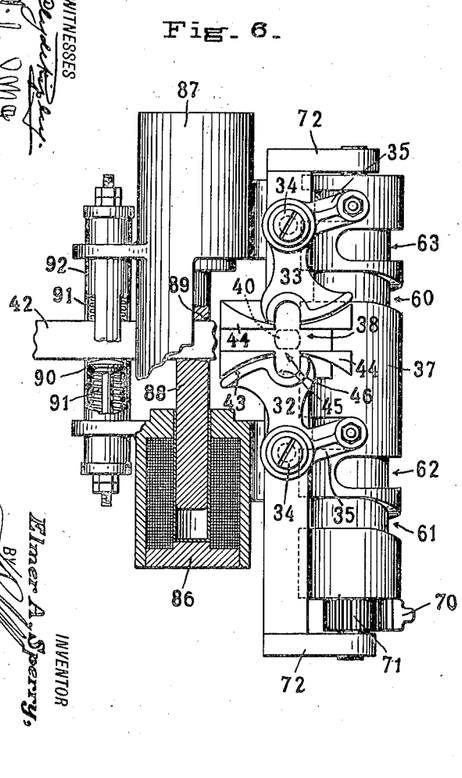
Fig. 6, is a bottom plan view of the gear shifting and selective mechanisms with the parts in the neutral position assumed when the clutch pedal is down and the clutch disengaged, one of the selector solenoids and one of the devices for centering the shifter rods being shown in section.
Figure 7:
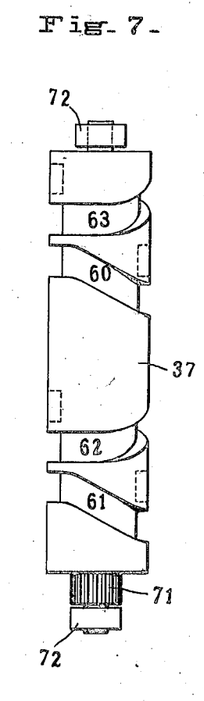
Fig. 7, is a detached view of the cam cylinder as viewed from a point at the right of Fig. 6.
Figure 8:
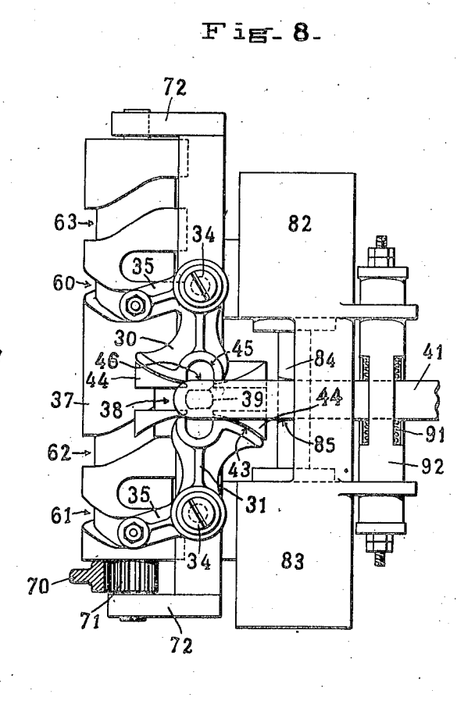
Fig. 8, is a top plan view of the shifting and selective mechanisms, with the parts in the neutral position.

In the particular type of change speed gear mechanism illustrated and which is typical of most change speed gear sets employed at the present time, both in and out, and forward and back rocking movements of the gear shifting shaft 18 are necessary to effect the various gear combinations. The gear shifting mechanism disclosed therefore embodies four shifters, one, designated 30 for moving the gear shifting shaft 18 outwardly, another 31, for moving shaft 18 inwardly, a third 32, for rocking the gear shifting shaft backwardly and a fourth one 33 for rocking said shaft forwardly. These shifters are, in effect, small bell cranks, pivoted on centers 34, each having a crank arm 35, carrying a cam roll 36, at its end engaging in a cam groove in the cam cylinder 37, which cylinder thus forms a common actuator for all the shifters. The gear shifters are arranged, as shown, in pairs, the out and in movement shifters 30 and 31 forming the upper pair and the back and forward gear shifters 32 and 33 forming the lower pair. The members of each pair are disposed opposite each other and there are provided channels 38 between the members of the pairs to receive the lugs 39 and 40 on the two shift rods 41 and 42 respectively. The opposing faces of the shifters of each pair are arcuate, as indicated at 43 to coöperate with the arcuate guards 44 adjacent the same and the shifters are furthermore provided with sockets or recesses 45 adapted to register with oppositely disposed openings 46 in the guards 44 when the shifters have been moved to the so-called "neutral" position indicated in Figs. 6 and 8. The shift rod 41, which is the one for imparting the longitudinal movements to the gear shifting rock shaft 18, is pivotally connected at its rear end with one arm of a pivoted bell crank 47, the other arm of which is forked as at 48 to engage with a shipping collar 49 on shaft 18 and the shift rod 42 is pivoted to a rocker arm 50 on shaft 18 for imparting the forward and back rocking movements thereto. The shipping fork connection 48—49 with shaft 18 permits of the necessary rocking movements of the shaft and a right-angled knuckle joint link 51 may be provided at the connection between the link 42 and rocker arm 50 to prevent this joint from interfering with the longitudinal movements of the gear shifting shaft.

Figures 9, 10:
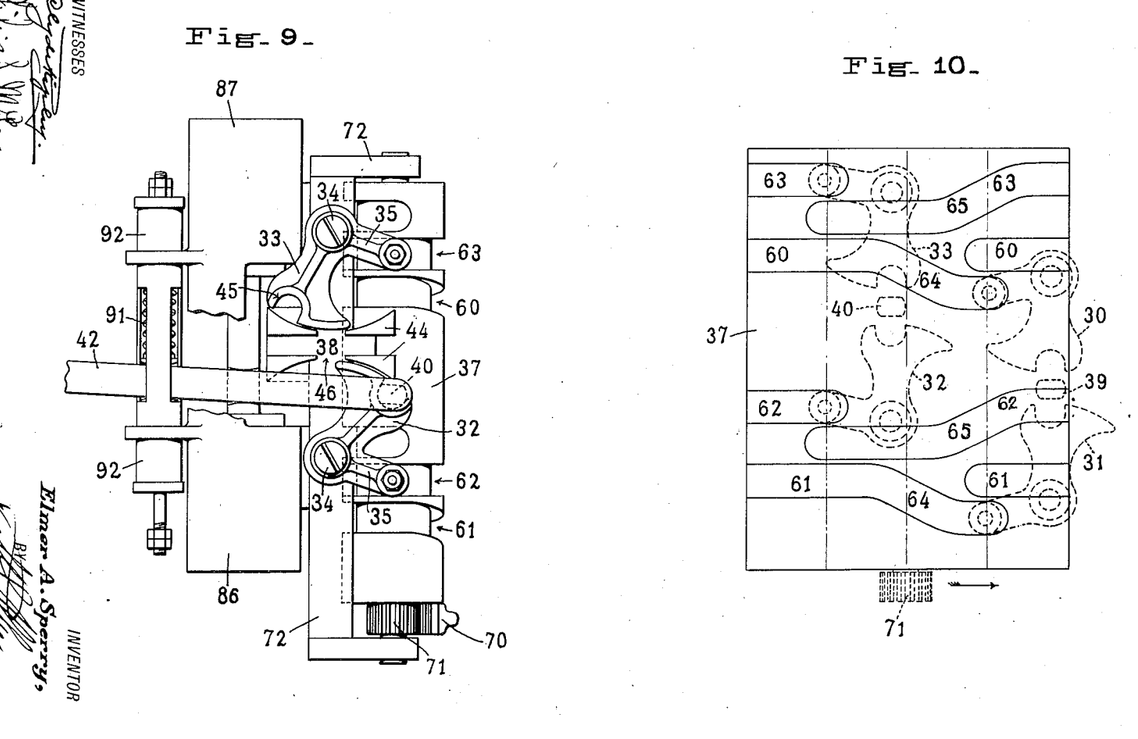
Fig. 9, is a bottom view similar to Fig. 6, showing the parts as they appear when pressure on the clutch pedal has been released and the cam cylinder has rotated to actuate the cam levers through their gear shifting movements, one of these so-called gear shifters being shown in this case as having drawn forward one of the gear shift rods.
Fig. 10, is a development of the cam cylinder which actuates the shifters.

The general plan of operation of the cam which actuates the shifters will perhaps be best understood from Fig. 10, wherein the relation and shape of the cam grooves is most clearly shown. Said cam, which is in the form of a rotatable cylinder, has four cam grooves therein, one near one end of the cylinder and designated 60, for actuating the outward moving shifter 30, a reversely operating cam groove 61, at the opposite end of the cylinder for actuating the inward moving shifter 31, a third cam groove 62 for actuating the backward motion shifter and a cam groove 63 for actuating the forward motion shifter. In gear mechanisms of the type herein illustrated, the in and out movements of the gear shifting shaft must take place before the back and forward rocking movements thereof, and the cam is therefore designed to operate the in and out motion shifters first and the back and forward gear shifters afterward. The neutral position of the four cam levers just prior to the commencement of the gear shifting movement of the cam is indicated in dotted lines in Fig. 10, in which position the cam rolls are at the commencement end of the cam grooves. Rotation of the cam from this point is in the direction indicated by the arrow and it will be noted that the active portions 64 of the out and in movement cam grooves 60 and 61 is in advance (considering the direction of movement) of the active portions 65 of the back and forward movement cam grooves 62 and 63. The out and in movement cam levers therefore operate in advance of the back and forward movement cam levers and in the particular form shown the shifting movements of the out and in cam levers is fully completed before the shifting movements of the back and forward cam levers is even commenced.

While the cam for actuating the shifters may be operated in any suitable way, I prefer, mostly for the sake of gaining the interconnection between the gear shifting mechanism and the clutch, to operate said cam from the clutch operating mechanism. In the present instance this is accomplished by providing the clutch pedal with a segmental rack 70 meshing with a pinion 71 carried by the cam cylinder. The cam cylinder is journaled to rotate freely in suitable bearings 72. By this arrangement when the clutch pedal is depressed to throw out the clutch, the cam cylinder will be rotated in a forward direction and the parts will be carried into the neutral position shown in Figs. 6 and 8. When pressure on the clutch pedal is released, the clutch spring (against the pressure of which the clutch pedal has to be operated) returns the clutch pedal back to its normal upper position and in so doing the cam cylinder is rotated backward, during which backward rotation, the cam levers operate, in case it is intended that they should so operate, to effect the proper shifting of the gears.

The actual control of the gear shifting operations is effected in the present illustration from a controller 80 mounted at a convenient point, say on the steering wheel, which controls certain selective devices for rendering operative the different gear shifters.

The selective devices here take the form of four solenoid magnets arranged in two pairs and adapted according as they are energized to engage the shift rods with the different gear shifters. The solenoids 82 and 83 of the upper pair are disposed opposite each other and serve, according as to which one is energized, to shift the solenoid core 84 in one direction or the other. The upper shift rod 41 is connected with the core 84, as by being seated in a recess 85 therein, so as to move with the said core. Thus, when the solenoid 82 is energized, the tendency will be to draw the solenoid core into that coil and the parts being in the neutral position shown in Fig. 8, the effect will be to shift the rod 41 over and carry the connecting lug 39 on that rod through the opening 46 in the arcuate guard 44 into the pocket 45 in the outward movement gear shifter 30. The energization of solenoid 83 would serve in a similar fashion to couple up the shifter rod 41 with the inward movement gear shifter 31. The construction and operation of the lower pair of solenoids is similar to that just described. These solenoids 86 and 87 have a core 88, provided with a recess 89 in which is engaged the shifter rod 42. When solenoid 86 is energized, and the parts are at neutral, as in Fig. 6, the solenoid core will, in its movement, shift the rod 42 over and carry the connecting lug 40 on that rod, through the opening 46 in the guard 44 into the pocket 45 in the backward movement shifter 32, thus coupling the shift rod to that particular shifter. On the other hand the energization of solenoid 87 will serve to couple shift rod 42 up to the forward movement shifter 33.

Means are provided for centralizing and uncoupling the shifter rods from the shifters when the parts are returned to the neutral position (Figs. 6 and 8), which means here takes the form of a pair of plungers 90 acted on by spring 91 and pressing against opposite sides of each shift rod. These plungers are evenly balanced so as to always exert a tendency to return the shift rods to an intermediate position uncoupled from both cam levers. The plungers are shown as guided and protected in casings 92.

The controller 80, previously referred to, is shown simply as a pivoted handle 95, arranged to register with the indicating characters 96 on a segment 97, and carrying a brush 98 to make engagement with various contacts on an insulating base 99.

The gear mechanism illustrated is of the three speed forward and one speed reverse type and the markings on the indicator segment are accordingly "1," "2," and "3," indicating the three forward speeds, "R" for the reverse speed and "N" for the neutral condition of the gears.

Shifting of the gears before the clutch has first been thrown out is prevented in the present instance by making the energization of the selector solenoids dependent upon the act of disengaging the clutch. For this purpose I have shown the clutch pedal as carrying a switch blade 100 to coöperate with a relatively stationary switch blade 101, forming a part of the circuit for the out and in magnets 82 and 83 and a second switch blade 104 to engage with a relatively stationary contact blade 105 in the circuit of the back and forward magnets 86 and 87.

Figure 11:
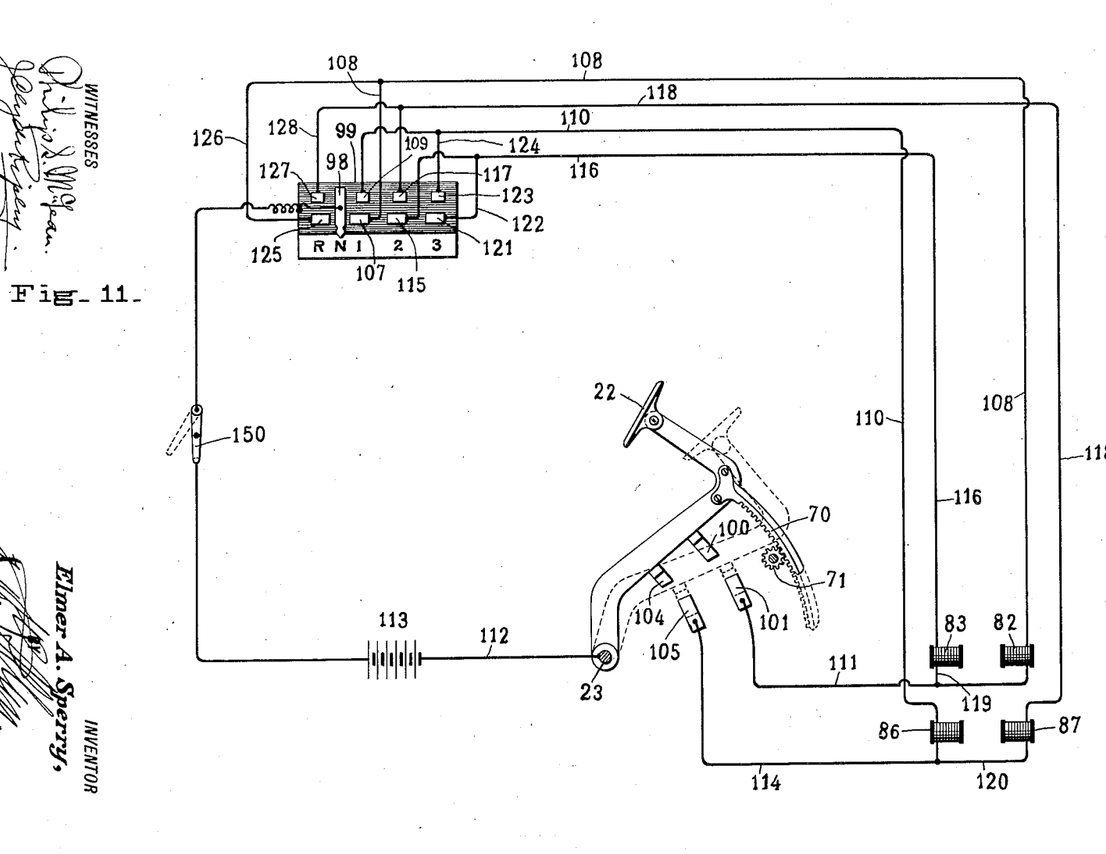
Fig. 11, is a diagrammatic representation illustrating the wiring connections and the general working of the system.

The wiring for the control system illustrated, will be understood by reference to Fig. 11. When the controller handle is turned from the neutral position "N" toward the first speed position "1" the brush 98 makes engagement first with a contact 107, connected by conductor 108 with the "out" magnet 82 and then with a contact 109 connected by conductor 110 with the "back" magnet 86. From magnet 82, the circuit is completed through conductor 111, the first clutch pedal switch 101—100 and common return 112, which includes a current source 113, to the controller brush 98. The circuit for magnet 86 is completed through conductor 114, the second pedal operated switch 105—104 and common return 112.

When the controller handle is moved to the second speed position "2", the controller brush engages first with contact 115 connected by conductor 116 with the "in" magnet 83 and then with contact 117 connected by conductor 118 with the "forward" magnet 87. Circuit from magnet 83 is completed by short connection 119 to conductor 111, the first pedal switch 101—100 and common return 112, while the rest of the circuit for magnet 87 is by way of short connection 120 to conductor 114, the second pedal operated switch 105—104 and common return 112.

Movement of the controller handle to the third speed position "3" carries the contact brush first into engagement with contact 121, which is connected by conductors 122—116 with the "in" magnet 83, and then into engagement with contact 123 which is connected by conductors 124—110 with the "back" magnet 86. The circuits for magnets 83 and 86 respectively are completed through conductors 119—111, the first pedal switch and common return 112, and through conductors 114, the second pedal switch and the common return.

When the controller handle is turned from the neutral position to the reverse position "R", the contact brush engages first with the contact 125, connected by conductors 126—108 with the "out" magnet 82 and then with contact 127, which is connected by conductors 128—118 with the "forward" magnet 87. The rest of the circuit for magnet 82 is by way of conductor 111, the first pedal operated switch 101—100 and common return 112, and for magnet 87 by way of conductors 120—114, the second pedal switch 105—104 and common return 112.

To more fully understand the operation of the invention let it be assumed that the gears have been left at "neutral" and that the parts occupy the position indicated in Figs. 1, 2, 3 and 4. To start ahead on the first speed, the controller handle is turned to "1". This sets the circuits for the "out" and "back" magnets in condition to be completed by the pedal switches. The clutch pedal is now depressed. The downward movement of the clutch pedal serves through the rack and pinion connection to rotate the cam cylinder forward into the position indicated in Figs. 6 and 8. In the rotation of the cam cylinder to this so-called neutral position, the gear shifting cam levers are rocked into a neutral position, where, as shown, each shift rod may be coupled to either one of its respective cam levers. At near the end of the downstroke of the pedal, the first pedal switch is closed and then the second pedal switch is closed. The circuits are thus completed, first through "out" magnet 82 and then a moment later through the "back" magnet 86. Magnet 82 draws over the shift rod 41 and couples up that rod with the outward movement shifter 30 and magnet 86 couples up the shift rod 42 with the backward movement shifter 32. As pressure on the clutch pedal is released, the cam cylinder rotates backward (under influence of the clutch spring, or supplementary means if necessary) and by reason of the difference in timing of the cams it rocks first the out and in movement gear shifters and then the backward and forward movement gear shifters. The shift rods 41 and 42 being coupled respectively to the outward and back movement gear shifters, the shifting shaft 18 will first be given an outward longitudinal movement and then a backward rocking movement. This combined outward and back movement being the movement necessary to effect engagement of the first speed gears, (as indicated on the H-segment 21), it follows that the gears will now be set for the first speed. After the gears have thus been shifted, the final part of the return movement of the clutch pedal allows the clutch to become engaged and the motor is then driving forward on the first speed. Fig. 9 is a bottom view of the parts at this time. To go into second speed it is only necessary to set the controller at "2", push the clutch pedal down and allow it to come back up into the clutch-engaged position. This position of the controller sets the circuits for the "in" and "forward" magnets. Upon the downward movement of the clutch pedal the cam cylinder rotates to carry the gear shifters back into the neutral position (Figs. 6 and 8), and since the shift rods are, during this time still held coupled to the out and back shifters by the arcuate guards 44, these shifters act to return the gears to neutral. The parts are so designed however that the clutch is disengaged before the return movement of the gears takes place. As soon as the shifters have been turned far enough to bring the pockets 45 into register with the openings 46 in the guards 44, the centralizing plungers carry the shift rods 41 and 42 into the intermediate position and the circuits for the "in" and "forward" magnets having by this time been completed by the pedal switches, these magnets act to couple the shift rods, 41 and 42 to the inward and forward movement shifters 31 and 33 respectively. As pressure on the clutch pedal is released, the cam cylinder rotates backwardly, the inward and forward movement shifters operate sequentially to move the shifting shaft 18 inward and forward and finally the clutch is engaged with the gears in second speed.

In a similar fashion the shift from second to third speed is accomplished, the placing of the controller at "3" setting the circuits for the "in" and "back" magnets 83 and 86 respectively, the downward movement of the clutch pedal effecting first a disengagement of the clutch, then a returning of the gears to neutral and finally a coupling of the shift rods 41 and 42 to the inward and back movement shifters, and the upward movement of the clutch pedal providing a shifting of the gears from second to third and an engagement of the clutch after the gears have been so shifted.

For reverse speed, the controller being placed at "R" sets the circuits for the "out" and forward magnets 82 and 87 respectively, and upon operation of the clutch pedal down and up in the manner described, the out and forward movement shifters 30 and 33 operate to shift the gears and the clutch is engaged with the gears in reverse.

The sequential disposition of both the pedal switches and the controller contacts insures of the connection of the shifter rod 41 with either the outward or the inward movement shifter in advance of the coupling of the shift rod 42 to the back or forward movement shifters, irrespective of whether the controller is set before or after the clutch pedal is depressed. In either event therefore, the out and in movement shifters, which are the first to operate, are coupled to the gear mechanism before the back and forward movement shifters.

For the purpose of rendering the gear shifter system operative or inoperative as desired, there may be provided an "on and off" switch 150 of any preferred construction and disposed at some convenient point in the system.

The utility of my invention will be readily appreciated from the foregoing because it will be seen that the invention renders it possible for one to shift the gears, at present the most difficult part of driving a car, without any previous experience, because with this invention all that is necessary is merely to select by the controller the speed combination desired and then to press down on the clutch pedal and allow the clutch to come back into engagement. Furthermore the driver of the car is in this way relieved from memorizing any particular method or order of operations such as have heretofore had to be observed in the operating of a car.

While I have for convenience sake, referred to the changing from one gear combination to another as a "shifting" of gears, I would have it understood that this is used simply in a relative sense and comprehends any method by which the various speed combinations may be effected in different types of change speed gear mechanisms. Other expressions employed by me will also be understood as used in a descriptive rather than in a limiting sense, except is so far as may be required by the prior art.

While it is designed to use the various features and elements in the combination and relations described, some of these may be altered and others omitted without interfering with the more general results outlined, and the invention extends to such use.

What I claim is:—

1. The combination with change speed gear mechanism, of devices for shifting each combination of gears in said gear mechanism into operative engagement, mechanism operating the devices for each combination of gears in sequential order whereby to shift the gears of a combination by a series of dis-simultaneous steps and selectively controlled means for coupling the said actuated devices to the gear mechanism.

2. The combination with change speed gear mechanism, of a plurality of actuated devices for shifting each combination of gears in said gear mechanism into operative engagement, selecting means for simultaneously rendering operative the devices necessary for shifting a given set of gears and a controller for said selecting means.

3. The combination with change speed gear mechanism, of a plurality of devices for operatively engaging each combination of gears in said gear mechanism, a common actuator for said devices arranged to operate the power devices for each gear set in dis-simultaneous order, and means for selectively coupling the devices for the respective gear sets to the gear mechanism.

4. In combination, a change speed gear set, a shifting means movable in a plurality of directions for effecting each of the different gear combinations, a plurality of shifters for each gear combination for imparting the necessary movements for each gear combination to the gear shifting means, a common actuator for the shifters and selectively controlled means for actively coupling the shifters for the different gear combinations to the gear shifting means.

5. In combination, a motor, transmission gearing, a clutch interposed between the motor and transmission gearing, clutch operating mechanism, means operated by said clutch operating mechanism for operatively engaging the gears of the transmission gearing, means for controlling the operation of the said gear shifting means and means operated by the clutch operating mechanism for controlling operation of the said controlling means.

6. In combination, a motor, transmission gearing, a clutch interposed between the motor and transmission gearing, clutch operating mechanism, shifters for varying the gear combinations of the transmission gearing, a common actuator for said shifters operated by the clutch operating mechanism, shiftable connections from the transmission gearing to the shifters, means for normally shifting said connections out of engagement with the shifters and selectively controlled means for shifting the said connections into operative engagement with the different shifters.

7. In combination, a motor, speed changing transmission mechanism, clutch mechanism interposed between said motor and said speed changing mechanism, a common operator for releasing the clutch mechanism and changing the speed transmission mechanism, a manually operable setting and indicating device, a selecting mechanism controlled thereby for coupling said common operator into the speed changing relation indicated by said setting devices and means operated by the said common operator for rendering the selecting mechanism operative only under predetermined conditions of the clutch mechanism.

8. In combination, a change speed gear set, a gear shift shaft having compound forward and back and in and out movements for effecting the different gear combinations, mechanism including devices for imparting the compound movements to the gear shift shaft necessary for the different gear combinations and selectively controlled means for coupling the shift shaft to the devices of the mechanism necessary to impart the different compound shifting movements thereto.

9. In combination, a change speed gear mechanism, shift rods connected with the gear mechanism, power mechanism arranged to impart movement to one of the shift rods in advance of the other and selectively controlled means for coupling the shift rods to the power mechanism.

10. In combination, a gear set, a longitudinally movable gear shifting rock shaft, shift rods for imparting longitudinal and rocking movements to the gear shifting shaft, power mechanism for operating said shift rods arranged to operate the longitudinally shifting rod in advance of the rocking shift rod and means for operatively coupling said shift rods to the power mechanism.

11. In combination, change speed gear mechanism, shifters for the same, an actuator operating all of said shifters operable by one movement to accomplish the movement of said shifters necessary for shifting the gears and operable by a different movement to accomplish the movement of the shifters necessary for returning the gears back to a neutral condition and means for selectively coupling different ones of the said shifters to the change speed gear mechanism.

12. In combination, a gear set, a longitudinally movable gear shifting rock shaft, a rocker arm on said shaft, a bell crank connected with the shaft for shifting the same longitudinally, shift rods connected to the rocker arm and bell crank respectively, power mechanism for operating said shift rods and means for selectively coupling the shift rods to the power mechanism.

13. In combination, change speed gear mechanism, shifters for the same, cam mechanism for operating the shifters and selectively controlled means for rendering the different shifters operative.

14. In combination, change speed gear mechanism, shifters for the same, cam mechanism operative in one direction to actuate the shifters to shift the gears and operative in another direction to actuate the shifters to return the gears to a neutral condition, and selectively controlled means for rendering the shifters operative.

15. In change speed gearing, the combination with a change speed gear set and a shaft by which the gears are shifted, of a cam member and means for actuating the same, levers operated by the cam member, shifter rods connected with the gear shifting shaft and selectively controlled means for coupling the shifter rods to the respective levers.

16. In combination, gear mechanism, a rotary cam member, shifters operated by said cam member and normally uncoupled from the gear mechanism, and selectively controlled means for operatively coupling said shifters to the gear mechanism.

17. In combination, change speed gear mechanism, shifters adapted to be operatively coupled to the gear mechanism and a rotatable cam member for actuating the shifters, arranged in its rotation in one direction to actuate the shifters to shift the gears into operative engagement and in the opposite direction to actuate the shifters to return the gears to a neutral condition.

18. In combination, change speed gear mechanism, shifters adapted to be operatively coupled to the gear mechanism, a cam member for actuating the shifters, and means operating said cam member to actuate the shifters to throw the gears into operative engagement and to throw the gears into a neutral condition.

19. In combination with change speed gear mechanism, shifting devices connected therewith, an actuator for said gear shifting devices, power devices for selectively controlling the shifting devices and a controller for the said power selective devices.

20. In combination with change speed gear mechanism, gear shifting means connected therewith, means for controlling selective operation of said gear shifting means, control means for setting the selective controlling means for the gear combinations desired, operating means for the gear shifting means operable in one direction to cause the gears to be carried to neutral condition and control means operative to render the selective means operative only at the end of the neutralizing movement of the said operating means.

21. In combination, change speed gear mechanism, shifters therefor, a device for actuating the gear shifters to throw the gears into neutral position or into different speed combinations, selective mechanism controlling the shifters, and means for rendering the selective mechanism inoperative when the gears are being shifted and operative when the parts are in neutral position.

22. In combination, change speed gear mechanism, shifters for the same, an actuator for the shifters, connections from the change speed gear mechanism, means for selectively coupling said connections to the different shifters and means for operating the actuator to actuate the shifters to throw the gears into neutral condition and to actuate the selected shifters.

23. In combination with a motor, change speed gear mechanism and a clutch interposed between the motor and change speed gear mechanism, clutch operating means, gear shifting means operated by the said clutch operating means, normally inoperative means for controlling selective operation of said gear shifting means, means for setting said selective means for the gear combinations desired and means operated by said clutch operating means for rendering operative the selective controlling means.

24. In combination, change speed gear mechanism, shifters, connections from said shifters to the change speed gear mechanism, an actuator for the shifters, selective means operative in the neutral condition of the parts to selectively render different shifters operative, means for operating the actuator to actuate the shifters to return the gears to a neutral condition and to actuate the selected shifters and means for rendering the selective means inoperative in said latter operation of the actuator.

25. In combination, change speed gear mechanism, mechanically operated shifters, operating connections from said shifters to the change speed mechanism and electrically operated selective means for rendering operative the different shifters.

26. In combination, change speed gear mechanism, shifters, an actuator therefor, selectively controlled means for rendering the different shifters operative and means for operating the actuator to effect a definite movement of the selected shifters and to effect a reverse movement of said shifters.

27. In combination, change speed gear mechanism, a cam cylinder, shifting levers operated thereby, means selectively controlling the gear shifting operations of the levers, and means for operating the cam cylinder in one direction to return the gears to a neutral condition and for normally operating the cam cylinder in the opposite gear-engaging direction.

28. In combination, change speed gear mechanism, mechanically operated gear shifting mechanism, electrically operated selective mechanism controlling the gear shifting operations of the gear shifting mechanism, and an electric controller for the selective mechanism.

29. In combination, change speed gear mechanism, a clutch and clutch operating means, shifters, connections from the change speed gear mechanism, means for selectively engaging said connections with the different shifters and an actuator for the shifters operated by the clutch operating means.

30. In combination, change speed gear mechanism, shifting levers operatively connected therewith, a clutch, clutch operating means and a cam cylinder for actuating the levers, operated by the clutch operating means.

31. In combination, change speed gear mechanism, clutch mechanism including a clutch releasing pedal, a cam member connected to operate with the clutch pedal and gear shifting means operated by said cam member and operatively coupled to the gear mechanism.

32. In combination, change speed gear mechanism, clutch mechanism including a clutch releasing pedal, a rack operated by said pedal, a cam cylinder geared to said rack, and gear shifting means operated by the said cam cylinder.

33. In combination, change speed gear mechanism, clutch mechanism including a clutch releasing pedal, a rack operated by said pedal, a cam cylinder geared to said rack, levers actuated by said cam cylinder and selectively controlled connections from said levers to the gear mechanism.

34. In combination, change speed gear mechanism, clutch mechanism including a clutch releasing pedal, a member connected to operate with the clutch pedal, gear shifting means arranged to be operated by said member, electrically operated selective means controlling operation of the gear shifting means and a circuit closer operated by the clutch pedal, controlling said selective means.

35. In combination with change speed gear mechanism, shifters, an actuator for said gear shifters, a pedal for operating said actuator, shift rods, means normally holding said rods disengaged from the shifters, and means for selectively engaging said shift rods with different shifters.

36. The combination with change speed gear mechanism, of gear shifting mechanism therefor, including sequentially operating shifters, electrically controlled selective devices for controlling the action of said shifters and circuit controlling devices for said selective devices arranged to operate sequentially in the order of operation of the shifters.

37. The combination with change speed gear mechanism, of gear shifting mechanism therefor, including a first set of shifters and a second set of shifters, electrically controlled selective devices for controlling the action of the different shifters and a circuit controller arranged to render operative first the selective devices for the first set of shifters and then the selective devices for the second set of shifters.

38. The combination with change speed gear mechanism, of gear shifting mechanism therefor, including a first set of shifters and a second set of shifters, electrically controlled selective devices for controlling the action of the different shifters and sequentially operating switches arranged to render operative first the selective devices for the first set of shifters and then the selective devices for the second set of shifters.

39. The combination with change speed gear mechanism, of gear shifting mechanism therefor, including a first set of shifters and a second set of shifters, electrically controlled selective devices for controlling the action of the different shifters, a circuit controller arranged to render operative first the selective devices for the first set of shifters and then the selective devices for the second set of shifters and sequentially operating switches arranged to control operation of the selective devices in the same order as the circuit controller.

40. In combination with a motor, change speed gear mechanism and a clutch interposed between the motor and gear mechanism, a pedal controlling operation of the clutch, gear shifting mechanism including sequentially operating shifters, electrical selective devices for controlling the action of the respective shifters, a circuit controller for selecting the selective devices necessary in effecting the gear changes desired and circuit controlling switches for the selective devices, operated by the clutch pedal in sequential order corresponding to the sequential order of operation of the sequentially operating shifters.

41. In combination with change speed gear mechanism, a pair of oppositely disposed mechanically operated shifters, a shift rod extending from the gear mechanism to a point between the shifters, opposed electromagnets arranged respectively when energized to carry the shift rod into engagement with one or the other of the shifters and means for selectively energizing the electromagnets.

42. In combination with change speed gear mechanism, a pair of oppositely disposed mechanically operated shifters, a shift rod extending from the gear mechanism to a point between the shifters, opposed electromagnets arranged respectively when energized to carry the shift rod into engagement with one or the other of the shifters, means for selectively energizing the electromagnets and means acting on the shift rod to normally centralize said rod between and disengaged from both the shifters.

43. In combination with change speed gear mechanism, a pair of oppositely disposed mechanically operated shifters, a shift rod extending from the gear mechanism to a point between the shifters, opposed electromagnets arranged respectively when energized to carry the shift rod into engagement with one or the other of the shifters, means for selectively energizing the electromagnets, and opposed spring plungers acting on the shift rod to normally carry the same to an intermediate position disengaged from both the shifters.

44. In combination with change speed gear mechanism, a pair of oppositely acting shifters provided with recesses arranged to be brought into registry, a shift rod extending from the gear mechanism to the shifters and provided with a connector lug adapted for engagement in the recess in either of the shifters and selectively controlled means for shifting the shift rod to carry the connector lug thereon into engagement with either of the shifters.

45. In combination with change speed gear mechanism, a pair of oppositely acting shifters provided with recesses arranged to be brought into registry, guards adjacent the shifters provided with openings in line with the registered recesses in the shifters, a shift rod extending from the gear mechanism to the shifters and provided with a connector lug disposed between the registering recesses in the shifters and selectively controlled means for shifting the shift rod to carry the connector lug thereon through the openings in the guard into the recesses in either of the shifters.

46. In combination, change speed gear mechanism, a pair of oppositely disposed and oppositely acting pivoted shifters provided with pockets adapted to be brought into registry, guards adjacent the shifters providing a passageway between the same and having openings in line with the registering pockets in the shifters, a shift rod extending from the gear mechanism to the shifters and provided with a connector lug arranged to travel in the passageway between the guards and selectively controlled means for shifting the shift rod to carry the connector lug thereon through the openings in the guards into the pockets in either of the shifters.

47. In combination with change speed gear mechanism, a shift rod for imparting certain shifting movements thereto, a second shift rod for imparting other shifting movements to the gear mechanism, a pair of oppositely acting shifters for the first shift rod, a pair of oppositely acting shifters for the second shift rod and oppositely acting selective devices for each shift rod for coupling the shift rods to either of the shifters therefor.

48. In combination with change speed gear mechanism, a pair of oppositely disposed mechanically operated shifters, a shift rod extending from the gear mechanism to a point between the shifters, a pair of opposed solenoids, a core actuated by said solenoids and connected with the shift rod for carrying said rod into engagement with one or the other of the shifters and means for selectively energizing the solenoids.

49. The combination with a motor, change speed gear mechanism and a clutch interposed between the motor and change speed gear mechanism, of a pedal for controlling the clutch, a rack carried by said pedal, a cam cylinder, a pinion connected therewith engaged by the said rack and gear shifting means actuated by the said cam cylinder.

50. The combination with change speed gear mechanism, of devices, operating connections from said devices to the change speed gear mechanism for shifting the gears thereof and means consisting of a plurality of devices for selectively coupling the said shifting devices to the gear mechanism.

51. The combination with change speed gear mechanism, of actuated devices for shifting the gears thereof, connections between the change speed gear mechanism and said actuated devices, and means consisting of a plurality of simultaneously operable power devices for selectively controlling said connections between said actuated shifting devices and the gear mechanism.

52. The combination with change speed gear mechanism, of actuated devices for shifting the gears thereof in dis-simultaneous steps, connections between the change speed gear mechanism and said actuated devices, means for selectively controlling said connections between said actuated devices and the gear mechanism and means for rendering said selective means inoperative in the process of the gear shifting.

53. The combination with change speed gear mechanism, of actuated devices for shifting the gears thereof in dis-simultaneous steps, connections between the change speed gear mechanism and said actuated devices, means for selectively controlling said connections between said devices and the gear mechanism, and means for rendering the said selective means inoperative during the process of gear shifting.

54. The combination with change speed gear mechanism, of actuated devices for shifting the gears thereof in dis-simultaneous steps, connections between the change speed gear mechanism and said actuated devices, means for selectively controlling said connections between said devices and the gear mechanism and control means for rendering said selective means inoperative during the process of gear shifting and operative after the gears are returned to neutral.

55. The combination with change speed gear mechanism, of actuated devices for shifting the gears thereof in dis-simultaneous steps, connections between the change speed gear mechanism and said actuated devices, means for selectively controlling said connections between said devices and the gear mechanism, and control means for rendering said selective means operative only when the gears are in their neutral or non-operative position.

56. The combination with change speed gear mechanism, of actuated devices for shifting the gears thereof in dis-simultaneous steps, connections between the change speed gear mechanism and said actuated devices, and means consisting of a plurality of simultaneously operable power devices for selectively controlling said connections between said actuated shifting devices and the gear mechanism.

57. In combination with change speed gear mechanism, actuated gear shifting means, power selective devices controlling operation of the gear shifting means, setting means for putting the selective devices necessary for the desired gear combinations in condition for operation and means for causing operation of the selective devices rendered operative by the setting means.

58. In combination with transmission gearing, a clutch and a clutch pedal operative in one direction to engage and in the other direction to disengage the clutch, gear shifting mechanism operable on the clutch-disengaging movement of the clutch pedal to return the gears to neutral and on the clutch engaging movement of the pedal to effect the different gear combinations, selective mechanism controlling the gear shifting operations of the gear shifting mechanism and means operated by the clutch pedal for rendering the said selective mechanism operative only when the pedal has been operated to disengage the clutch.

59. In combination, change speed gear mechanism, gear shifting mechanism therefor, electrically operated selective mechanism controlling the gear shifting operations of the gear shifting mechanism, an electric controller for controlling the circuits to be completed through the selective mechanism and a circuit closer for completing the circuits selected by the controller.

60. In combination with change speed gearing, shifters for effecting the different gear shifting operations, means for operating all of said shifters, connections from the change speed gearing and means for selectively coupling the said connections to certain ones of the different shifters.

61. In combination with change speed gearing, a cam cylinder, shifters operated by said cam cylinder and arranged in pairs at opposite sides of the cam cylinder, solenoids provided with cores and arranged in pairs disposed in rear of each pair of gear shifters, shift rods connected with the change speed gearing and guided between the shifters of each pair, the cores to the solenoids being connected with the respective shift rods and means for selectively energizing the different solenoids whereby to carry the shift rods into operative engagement with either of the shifters between which said rods are guided.

62. In combination with change speed gearing, a cam cylinder, shifters operated by said cam cylinder and arranged in pairs at opposite sides of the cam cylinder, solenoids provided with cores and arranged in pairs disposed in rear of each pair of gear shifters, shift rods connected with the change speed gearing and guided between the shifters of each pair, the cores to the solenoids being connected with the respective shift rods, means for centralizing the shift rods between the shifters of each pair, and means for selectively energizing the solenoids.

63. In combination with change speed gear mechanism including a gear shift shaft provided with a seat to receive a hand lever, gear shifting means and connections from said gear shifting means to the gear shift shaft.

ELMER A. SPERRY.

Witnesses:
ALBERT W. STRINGHAM,
FREDERICK C. NARVESEN.